United States Patent
Gaither et al.

(10) Patent No.: US 8,473,673 B2
(45) Date of Patent: Jun. 25, 2013

(54) MEMORY CONTROLLER BASED (DE)COMPRESSION

(75) Inventors: Blaine Douglas Gaither, Ft. Collins, CO (US); Russ Herrell, Ft. Collins, CO (US); Judson Eugene Veazey, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1638 days.

(21) Appl. No.: 11/166,608

(22) Filed: Jun. 24, 2005

(65) Prior Publication Data

US 2007/0016724 A1 Jan. 18, 2007

(51) Int. Cl.
  *G06F 13/00* (2006.01)
(52) U.S. Cl.
  USPC .................................. 711/104; 710/35
(58) Field of Classification Search
  USPC .................................. 711/104; 710/35
  See application file for complete search history.

(56) References Cited

U.S. PATENT DOCUMENTS

| 5,357,614 | A | * | 10/1994 | Pattisam et al. | 710/68 |
| 6,173,381 | B1 | | 1/2001 | Dye | |
| 6,370,631 | B1 | | 4/2002 | Dye | |
| 6,564,305 | B1 | | 5/2003 | Moore | |
| 2004/0003196 | A1 | * | 1/2004 | Wilson et al. | 711/171 |
| 2004/0230767 | A1 | | 11/2004 | Bland et al. | |
| 2006/0271761 | A1 | * | 11/2006 | Riemens | 711/212 |

FOREIGN PATENT DOCUMENTS

WO   WO 9638846 A1 * 12/1996

* cited by examiner

*Primary Examiner* — Jared Rutz

(57) ABSTRACT

Systems, methodologies, media, and other embodiments associated with (de)compressing data at a time and in a location that facilitates increasing memory transfer bandwidth by selectively controlling a burst-mode protocol used to transfer data to and/or from a memory are described. One exemplary system embodiment includes a memory controller configured to (de)compress memory, to manipulate size data associated with compressed data, and to selectively manipulate a burst-mode protocol employed in transferring compressed data to and/or from random access memory.

27 Claims, 10 Drawing Sheets

MEMORY CONTROLLER BASED (DE)COMPRESSION

BACKGROUND

Data has conventionally been stored in random access memories (RAMs) like dynamic RAMs (DRAMs) in an uncompressed format. With the increasing cost of memory, and the increasing reliance of computing systems on DRAMs, efforts to conserve space in memory have occurred. These efforts have typically been concerned with compressing data in main memory. When data has been stored in a compressed format in main memory, the goal has generally been to save space. However, saving space in a DRAM may lead to a given block of data having no specific location pre-allocated in the DRAM, which may slow data transfers. Thus, storing a block of data in a compressed format may require compressing it, determining its size, and finding a free area of memory that can hold the compressed block. These conventional actions may entail performing complicated and thus time-consuming methods for determining true DRAM row and column data addresses. Also, these methods are typically performed after the data has been compressed. Thus, these conventional schemes, while saving memory space may negatively impact memory transfer bandwidth.

DRAMS are typically packaged in dual in-line memory modules (DIMMs). A DRAM may have millions of memory locations called cells. Each cell stores one bit of information. The cells are typically arranged in a matrix of rows and columns. A DRAM row may be referred to as a page. To access a DRAM cell, a memory controller sends electronic signals specifying the row address and column address of the target cell. The memory controller sends these row/column signals via a memory bus or memory interface that may have both address/command lines and data lines. The data lines carry data between a memory controller and a DRAM while the address/command lines carry addresses and commands between the memory controller and the DRAM. The data throughput between the memory controller and the DRAM depends on the number of data lines available (e.g., 64), and the frequency at which data can be transferred over those data lines.

Accessing a cell typically includes identifying to a DRAM a row in which the cell is located and then identifying to the DRAM a column in which the cell is located. Identifying the row typically includes a row address selection (RAS) action. Similarly, identifying the column typically includes a column address selection (CAS) action. Thus, in some systems, acquiring each bit of data may require two address/command actions. Therefore, some original DRAMS required multiple (e.g., up to six) system bus cycles for each memory access. This may lead to bottlenecks when transferring data to and/or from memory.

Additionally, when data is transferred from a processor to a memory controller and then to a memory, a bandwidth disparity may exist if the bandwidth of the processor to memory controller connection (e.g., front side bus) is greater than the bandwidth of the memory controller to memory connection (e.g., memory interface). This bandwidth disparity may also lead to bottlenecks when transferring data to and/or from memory. This bottleneck may be exacerbated by conventional memory-controller based (de)compression apparatus if a (de)compression latency exceeds a read/write latency. Since space-saving is the focus of these conventional systems, design trade-offs have typically accepted the bottleneck to achieve space savings.

To address at least part of these bottleneck issues, a burst-mode protocol has been employed for interacting with DRAMs. In one example burst-mode protocol, a single RAS action, followed by a single CAS action may lead to two or more bits of data being transferred to and/or from a DRAM. For example, a single RAS/CAS pair may cause four sequential data locations to be transferred. The most efficient data transfers would occur if a single RAS/CAS pair could be employed to transfer an entire row to and/or from a DRAM.

As is conventionally practiced, data that reside all within one row of a DRAM require only one new address command to be sent. Typically DRAM controllers take advantage of this and may also take advantage of burst-mode protocols. Furthermore, memory subsystems may set up DRAM mappings so that entire cache lines or typical data block structures start on appropriate burst-mode boundaries and do not cross new address (page) boundaries. However, typical compression schemes that focus on saving space leave a memory controller to track both size and starting location for a given data block.

Cache lines have sizes that are typically a multiple of burst-mode boundaries and a sub-multiple of a row boundary. Thus, cache lines typically have known starting points that facilitate uncompressed data from requiring less than an integer multiple of burst cycles or from requiring the data to cross multiple row boundaries.

BRIEF DESCRIPTION OF THE DRAWING

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
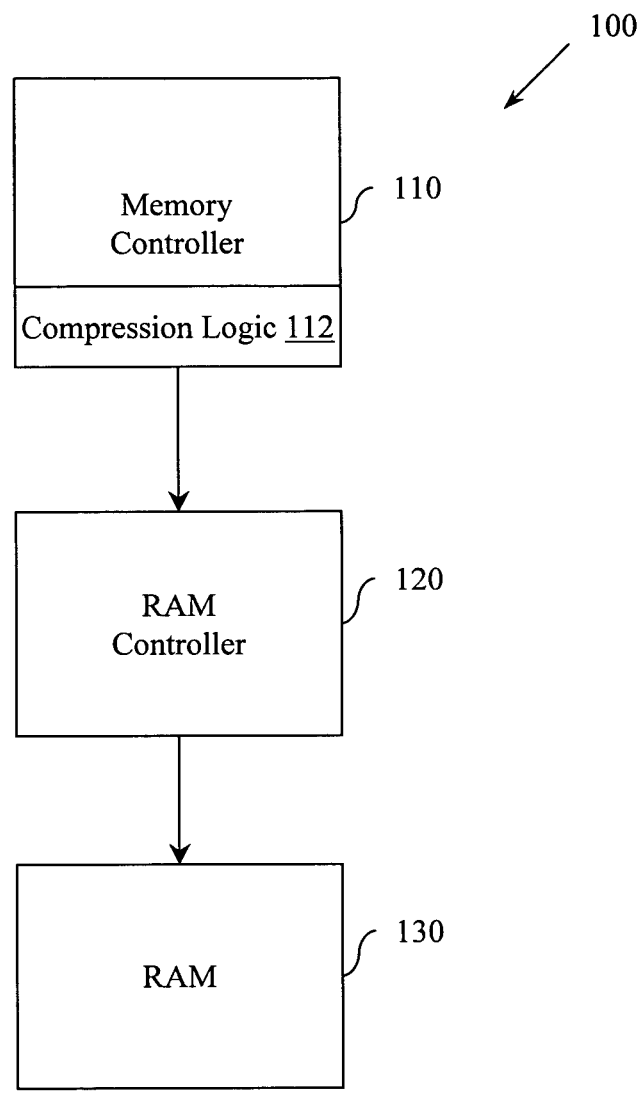
FIG. 1 illustrates an example memory controller, RAM controller, RAM architecture.

Example systems and methods described herein concern (de)compressing data at a time and in a location that facilitates increasing memory transfer bandwidth by selectively controlling a burst-mode protocol used to transfer data to and/or from a memory. The example systems and methods are more concerned with reducing memory transfer time than with reducing the amount of memory consumed by compressed data. Thus, example systems and methods regard data compression from a transmission optimizing viewpoint rather than a space saving viewpoint and therefore both compute and store compressed data sizes. Example systems and methods continue to align default data structures like cache lines on default burst-mode or row alignments that are optimum for uncompressed data. Furthermore, example systems and methods also align compressed data on default alignment boundaries. Thus, example systems and methods facilitate reducing memory controller computations and thus saving memory controller time. Additionally, example systems and methods mitigate storage penalties associated with looking up or calculating a unique starting address for a variable sized data structure like would be produced by compression.

Thus, even though a compressed piece of data may have a non-standard size that does not agree with a default structure size, example systems and methods may still employ a default data structure starting alignment. Although space will not be saved, transfer bandwidth will be saved and so will memory controller computations. In other words, a compressed data size may be employed to determine a burst length and/or number of bursts, but the default uncompressed size may be employed to compute a default starting alignment.

When data is stored in a DRAM, two major steps associated with accessing the data are row address selection (RAS) and column address selection (CAS). Multiple CAS operations may be performed for each RAS operation to access multiple bits of data in consecutive column addresses in a row. Reading and/or writing multiple column bits for every row access is called "burst-mode" operation. Burst-mode operations may be selectively controlled by the example systems and methods described herein since a burst length control data can be computed from size data associated with compressed data aligned on DRAM line boundaries. Selectively controlling the burst-mode operations facilitates reducing bottlenecks associated with data transfer between a memory controller and a DRAM. While burst-mode operations may be controlled, to facilitate saving bandwidth and transfer time, a default uncompressed data structure size may be used to compute a starting alignment.

Memory subsystems may use burst-mode accesses to store blocks of data on memory chips (e.g., DRAMs) that are accessible via relatively narrow interfaces. For example, a memory chip may have a 64 bit wide data bus for transferring data between the chip and a memory controller. However, typical lines written to memory (e.g., cache lines) may be wider (e.g., 128 bytes) than the data bus. Thus, writing a cache line may require numerous cycles on a memory interface. For example, writing a 128 byte cache line may require a 64 bit chip to be cycled 16 times to store the cache line.

A burst of sixteen accesses to consecutive column addresses would be an efficient mechanism for reading and/or writing the example 128 byte cache line to the example 64 bit DIMM. Thus, example systems and methods may use default burst-mode boundaries even when transferring less than a "full" cache line, (e.g., a compressed cache line) and thus facilitate manipulating a burst-mode protocol to increase the ratio of high efficiency bursts (e.g., 16 consecutive columns) while reducing the overall number of burst cycles.

In one example, compression and decompression may be performed in a memory controller interposed between memory accessing logics and memory. For example, data to be written may be received in a memory controller, compressed in the memory controller and transmitted to a RAM controller along with size information about the compressed data. The RAM controller may then write the compressed data to memory, taking care to align the compressed data line on the same default boundaries as an un-compressed version of the cache line would have used. Writing the compressed line to memory on default line boundaries may leave some space unused, but may consume fewer bus cycles than is conventionally possible. Having the size information available during the write operation may facilitate employing a more efficient burst and may also facilitate transferring a more precise amount of data, both of which can positively impact bus bandwidth.

Similarly, data may be read in a compressed format from a memory and provided, along with information concerning the size of the compressed data, by a RAM controller to a memory controller that will decompress the data. When reading the compressed data, the RAM controller may acquire size information about the compressed data, read only the actual compressed data while ignoring unused space, transmit only the data in the compressed block, and not transmit unused space at the end of a block. Thus data transfers and bus cycles may be reduced. The memory controller may then provide the decompressed data to a memory accessing logic. (De)compressing the data on the memory controller facilitates reducing the number of bus cycles required to read/write the data to/from memory since a smaller number of bits are transferred.

After transmitting compressed data, but not the unused space at the end of a line, the RAM controller can stop the burst-mode reading of the RAM, cease transmitting to the memory controller, and execute another command from the memory controller. Thus, subsequent commands can be placed on the command/address bus while the (de)compression logic is completing its (de)compression. This parallelization also facilitates reducing bottlenecks associated with memory transfer.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or may take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Logic", as used herein, includes but is not limited to hardware and firmware and combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically and/or statically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates an example memory controller 110, RAM controller 120, and RAM 130 in an architecture 100. The RAM 130 may be referred to more generally as a memory 130 and may be implemented, for example, as a DRAM packaged in a DIMM. Architecture 100 may be implemented, for example, in a computer, a printer, and other computing devices.

Memory controller 110 may be configured to receive an uncompressed data block to be stored in memory 130. The uncompressed data block may be received, for example, from a processor, an input/output logic, a cache, and so on. In one example, the uncompressed data block may be a cache line. Recall that cache lines are typically multiples of a burst-mode boundary.

Memory controller 110 may also be configured to compress the uncompressed data block into a compressed data block. Memory controller 110 may be configured to perform the compression in hardware. For example, memory controller 110 may include a compression logic 112 for performing the compression. While simple compression schemes like run length encoding, dictionary-based encoding, and so on, may be performed by compression logic 112, it is to be appreciated that other compression schemes that may be performed in hardware like compression logic 112 may also be employed. Memory controller 110 may also be configured to compute the size of the compressed data block. In one example, the size may be computed while the uncompressed data block is being compressed into the compressed data block.

With the size of the compressed data block available, memory controller 110 may also be configured to selectively manipulate a burst-mode protocol employed in communicating data with memory 130. In one example, the burst-mode protocol may be employed between RAM controller 120 and memory 130. In another example, burst-mode protocol may also be employed between memory controller 110 and RAM controller 120. Selectively manipulating the burst-mode protocol may include, for example, determining an RAS/CAS sequence associated with a configurable data bit burst length that will efficiently transfer the compressed data to and/or from the memory 130. Thus, instead of using a default data bit burst length and potentially recovering unused data bits, a more precise data bit burst length can be employed to protect against reading and/or writing unnecessary bits. Also, instead of using multiple instances of a default data bit burst length, a potentially longer data bit burst length may be computed. In one example, the data bit burst length may even be an entire row of data bits. While the compressed size may be used to determine the burst-mode or length, the uncompressed size may be used to compute a default starting alignment.

RAM controller 120 may be operably connected to memory controller 110 by a bus and to memory 130 by a memory interface. RAM controller 120 may be configured to receive the compressed data block and the size of the compressed data block from the memory controller 110 and to write the compressed data block to memory 130 via the memory interface using a burst-mode protocol. The number of bursts required to write the compressed data block to memory 130 may be controllable by RAM controller 120. The number of bursts may depend, for example, on the size of the compressed data block.

RAM controller 120 may be configured to write compressed data blocks as one or more sub-blocks of data that are aligned on a default starting alignment boundary associated with a default data structure in memory 130. While this may lead to some space being unused in memory 130, the benefits of writing to a default alignment boundary include being able to selectively control the burst-mode protocol to use more efficient bursts to transfer data to and/or from the memory 130 without having to track both data size and location. This in turn facilitates reducing bottlenecks associated with transferring data to and/or from memory.

RAM controller 120 may also be configured to store the size of a compressed data block so that it may be acquired upon a read access targeted at the compressed data block. Having the size of the compressed data block available facilitates selectively manipulating a burst-mode protocol employed to read data from memory 130. For example, if the size of a compressed data block is known to be two full rows and seven columns in a third row, then three precise RAS/CAS burst cycles can be programmed to amortize RAS/CAS command and bus cycling over the maximum number of data bit transfers. In conventional systems where the size of the compressed data is not known, or where the data is not aligned on line boundaries, no such RAS/CAS efficiency can be achieved. This example, while atypical for a memory system optimized for cache lines that are usually much smaller than entire ROWs of the DRAMs, illustrates another application of example systems and methods.

Thus, by determining the size of the compressed data block, by aligning compressed data on default alignment boundaries, and by selectively controlling a burst-mode protocol for transferring data, greater efficiencies in data transfer between memory controllers and memory can be achieved. Therefore, in one example, the number of bus cycles employed in providing the compressed data block to RAM controller 130 may be calculated from and controlled, at least in part, by the size of the compressed data block as computed by memory controller 110. In one example, the size of the compressed data block may be provided to RAM controller 120 explicitly as a value while in another example the size of the compressed data block may be provided to RAM controller 120 implicitly as an end-of-data marker. Likewise, in one example, RAM controller 120 may be configured to store the size of the compressed data block in memory 130 explicitly as a value while in another example RAM controller 120 may be configured to store the size of the compressed data block in memory 130 implicitly as an end of data marker. In another example, it may be memory controller 110 that is configured to store the size of the compressed data block. While the size of the compressed data block is described being stored in memory 130, it is to be appreciated that in some examples the size may be stored in other locations.

In one example, the uncompressed data block, when received at memory controller 110, may be accompanied by a memory action request. Thus, in one example, memory controller 110 may be configured to selectively compress the uncompressed data block based, at least in part, on the memory action request. Thus, some memory action requests may indicate that data is to be compressed while other memory action requests may indicate that data is not be compressed.

As described above, memory controller 110 may be configured to facilitate selectively controlling a burst-mode protocol employed to transfer data to and/or from memory 130. Additionally and/or alternatively, RAM controller 120 may be configured to compute a burst-mode control data based on data points like the size of the connection between RAM controller 120 and RAM 130, the size of the compressed data block, and so on. For example, the RAM controller 120 or the memory controller 110 may determine which RAS/CAS sequence(s) may be most efficient for transferring compressed data to and/or from the memory 130. For example, one custom RAS/CAS sequence that retrieves an entire row of compressed data that was aligned on a default alignment boundary may be more efficient than four default RAS/CAS sequences that retrieve one quarter of a row.

Figure 2:
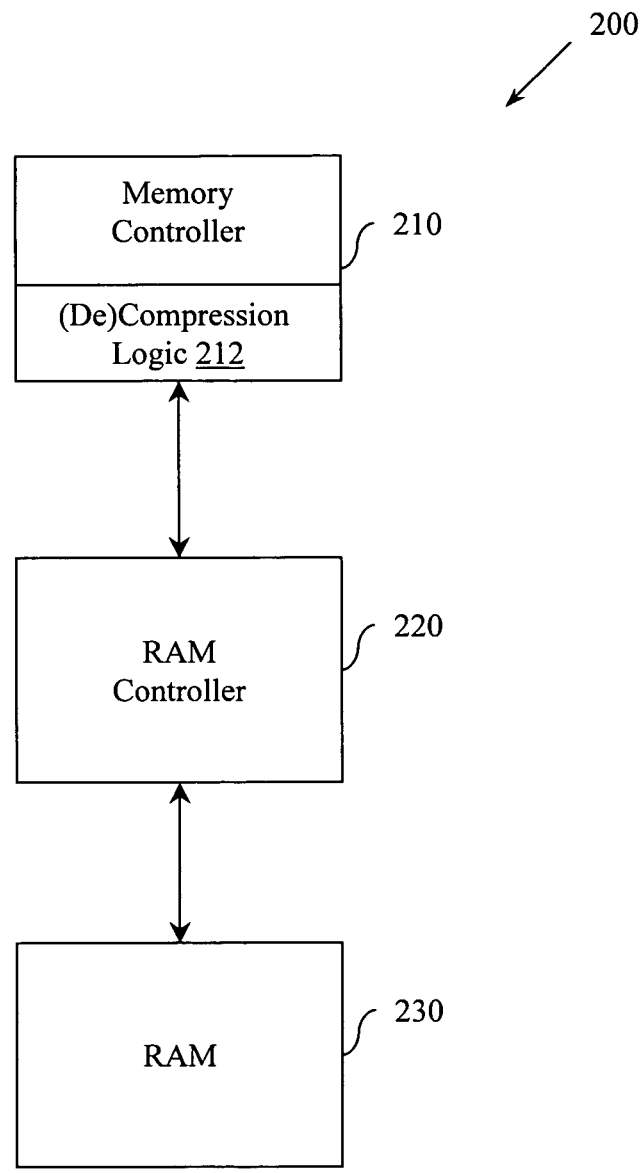
FIG. 2 illustrates another example memory controller, RAM controller, RAM architecture.

FIG. 2 illustrates another example memory controller 210, RAM controller 220, and RAM 230 in an architecture 200. In some examples, memory controller 210, RAM controller 220 and RAM 230 are similar to corresponding elements in FIG. 1. In architecture 200, memory controller 210 may also be configured to receive a request that a stored block of data be retrieved from RAM 230. In some cases, the block of data may be compressed. Thus, RAM controller 220 may be configured to retrieve the stored block of compressed data from RAM 230 via the memory interface using a selectively controlled burst-mode protocol. To facilitate selectively controlling the burst-mode protocol, RAM controller 220 may be configured to acquire the size of the stored block of compressed data. This size may be retrieved, for example, from memory 230 or from another location in which it was stored. With the size of the stored block of compressed data available, RAM controller 220 may customize the retrieval of the stored block of compressed data via the memory interface. For example, RAM controller 220 may selectively control the burst-mode protocol to use a particular RAS/CAS sequence with a particular data bit burst size. The sequence and/or size may be based, for example, on the size of the stored block of compressed data.

In one example of architecture 200, RAM controller 220 and/or memory controller 210 may be configured to decompress the block of compressed data after it is retrieved from memory 230. In one example, the block of compressed data may be decompressed in hardware associated with the RAM controller 220 and/or the memory controller 210. For example, memory controller 210 may include a logic 212 that is configured to decompress compressed data. Similarly, RAM controller 220 may be configured with a decompression logic (not illustrated). Thus, while logic 212 is illustrated in memory controller 210, it is to be appreciated that in some examples logic 212 may be located in RAM controller 220 while in other examples it may be separate hardware to which either memory controller 210 and/or RAM controller 220 may be operably connected.

In one example, memory controller 210 may be controlled to selectively decompress a block of compressed data into a decompressed block of data. Whether a block of compressed data is decompressed may depend, at least in part, on a memory read request received by memory controller 210. For example, some memory requesting logics may be aware that memory 230 can store compressed data and may request that data be stored in its compressed form.

Figure 3:
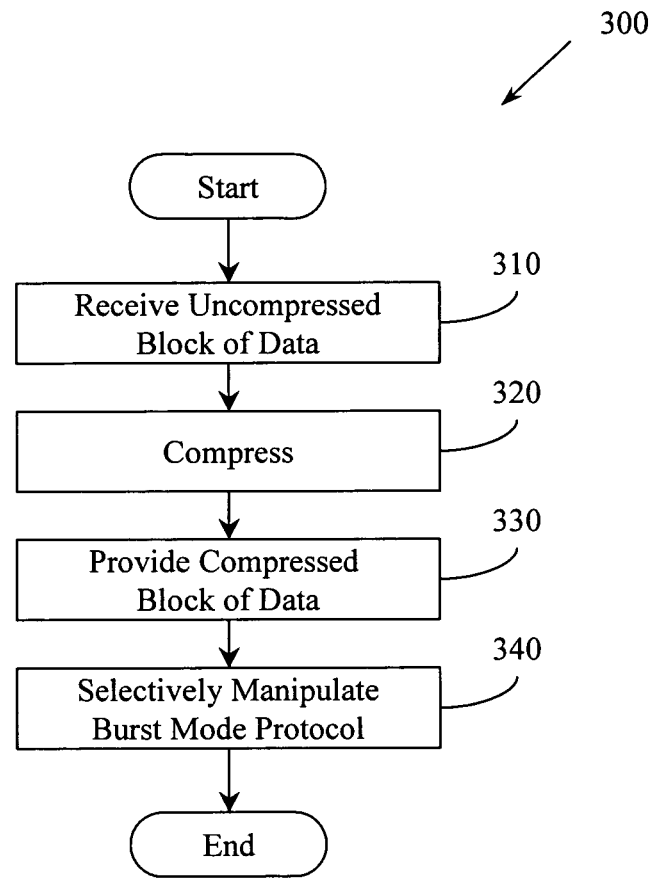
FIG. 3 illustrates an example method associated with saving compressed data.
Figure 4:
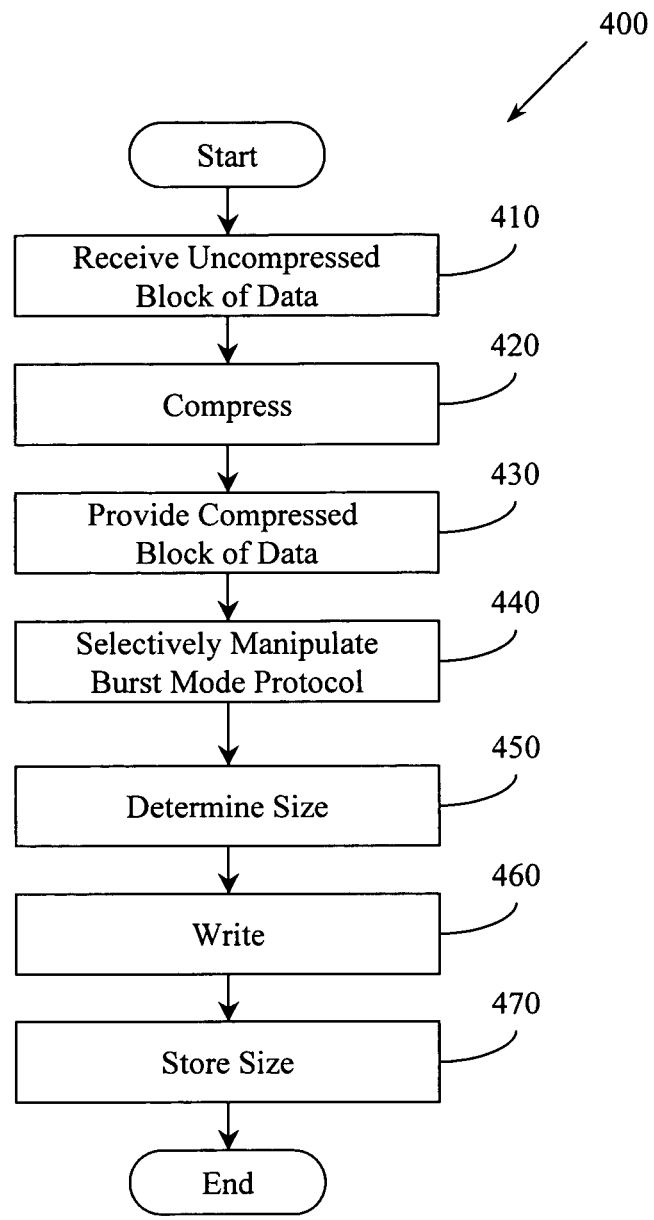
FIG. 4 illustrates another example method associated with saving compressed data.
Figure 5:
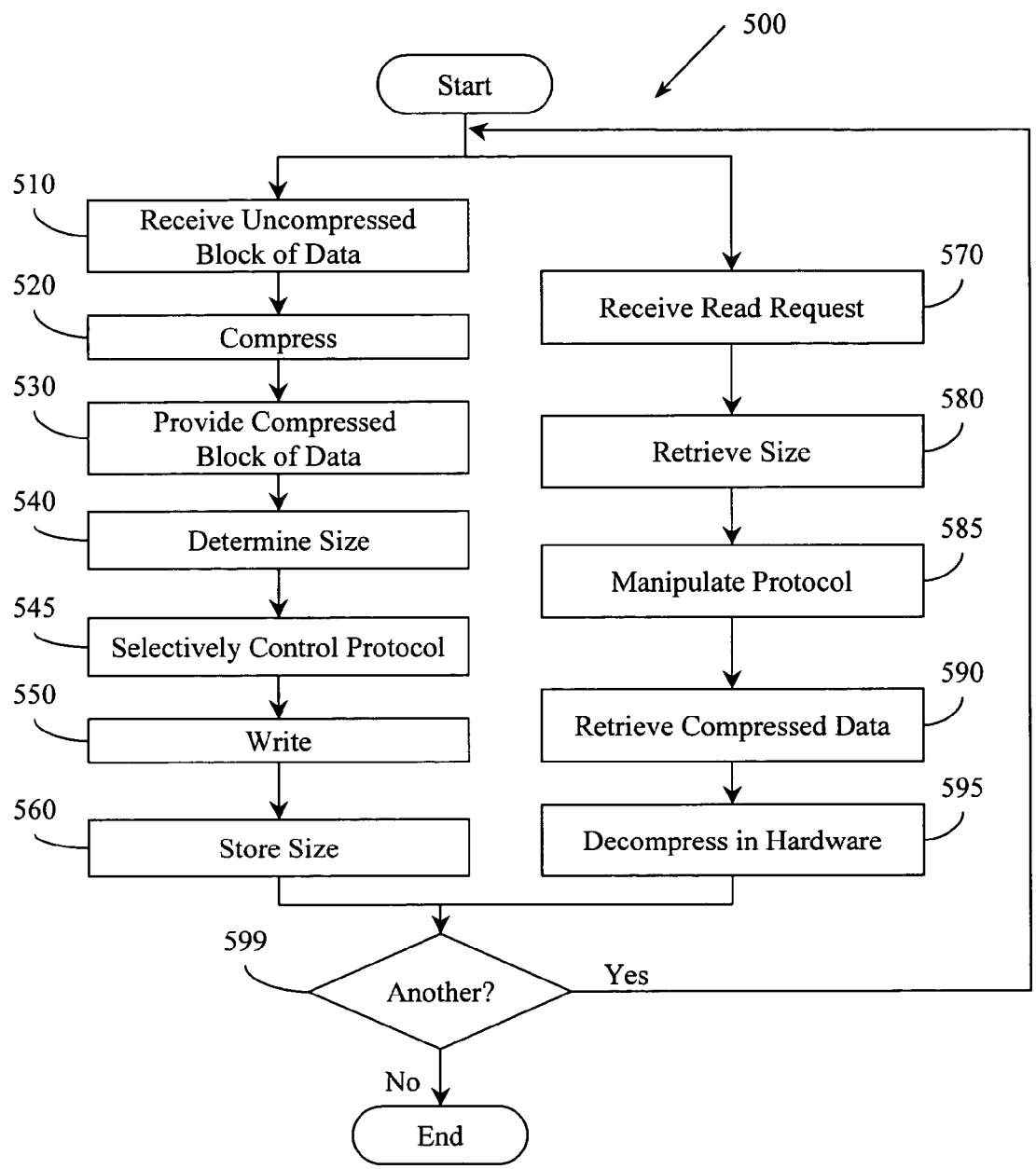
FIG. 5 illustrates an example method associated with reading and writing compressed data.

Example methods may be better appreciated with reference to the flow diagrams of FIGS. 3, 4 and 5. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. The processing blocks may represent a method step and/or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 3 illustrates an example method 300 associated with saving compressed data in a bandwidth efficient manner. Method 300 may include, at 310, receiving an uncompressed block of data to be stored in a memory. The data may be received into a memory controller. Method 300 may also include, at 320, compressing the uncompressed block of data into a compressed block of data. The compression may be done in hardware associated with the memory controller. Method 300 may also include, at 330, providing the compressed block of data to a RAM controller for storage in the memory. While several memory controller based (de)compression schemes may perform the actions described at 310 through 330, method 300 may also include, at 340, controlling the RAM controller to selectively manipulate a burst-mode protocol for transferring data to the memory. Selectively manipulating the burst-mode protocol may include, for example, identifying an RAS/CAS sequence to employ with a data bit burst-length value to more efficiently transfer data across a connection between the RAM controller and the memory. By way of illustration, a block of compressed data may be identified as consuming three rows in a DRAM and a portion of a fourth row. Thus, the burst-mode protocol may be manipulated to perform three full row writes and a fourth write of just the remaining portion. As opposed to using a series of default RAS/CAS sequences that may have written four sets of four consecutive data bits per row, the overall number of RAS/CAS sequences was decreased by the selective control. Note that although the compressed size may have been employed to control the burst length or number of bursts, the default un-compressed size may be employed to compute the starting alignment(s) for the writes. Thus method 300 will not require both tracking data size and computing some unique starting address.

FIG. 4 illustrates another example method associated with saving compressed data in a bandwidth efficient manner. Method 400 may include, at 410, receiving an uncompressed block of data to be stored in a memory. The data may be received into a memory controller. Method 400 may also include, at 420, compressing the uncompressed block of data into a compressed block of data. The compression may be done in hardware associated with the memory controller. Method 400 may also include, at 430, providing the compressed block of data to a RAM controller for storage in the memory. Method 400 may also include, at 440, controlling the RAM controller to selectively manipulate a burst-mode protocol for transferring data to the memory.

As mentioned above, several memory controller based (de)compression schemes may describe the actions performed at 410 through 430. However, method 400 may also include, at 450, determining the size of the compressed block of data. With the size of the compressed data available, improvements over conventional systems may be made. Thus, method 400 may include, at 460, writing the compressed block of data to memory as a sub-block(s) of data aligned on a default alignment boundary using the burst-mode protocol. Thus, a memory controller is not tasked with tracking both the size and location for a data block. The burst-mode protocol may be controlled, for example, by data like the size of the compressed block of data. Controlling the burst-mode protocol may include, for example, customizing an RAS/CAS sequence with a more precise data bit burst length based on the size of the compressed data to be written. For example, when the compressed data is a cache line that will fit in less than a single row of memory, a single CAS/RAS sequence with a data bit burst length equal to the size of the compressed cache line may be employed when the compressed cache line is written beginning on a default alignment boundary.

Method 400 may also include, at 470, storing the size of the compressed block of data so that the size of the stored block of compressed data may be acquired upon a read access targeted at the block of compressed data. Having the size of the compressed data block stored facilitates more efficiently retrieving compressed data. In one example, the size of the compressed data block may be stored as a value in the memory in which the compressed data is stored. In another example, the size of the compressed data block may be indicated implicitly in the memory by, for example, an end-of-data marker appended to the compressed data block. In still another example, the size of the data may be stored in a location other than the memory where the compressed data is stored.

FIG. 5 illustrates a method 500 associated with reading and writing compressed data in a bandwidth efficient manner. Method 500 may include, at 510, receiving an uncompressed block of data to be stored in a memory. Method 500 may also include, at 520, compressing the uncompressed block of data into a compressed block of data and at 530, providing the compressed block of data to a RAM controller for storage in the memory. Method 500 may also include, at 540, determining the size of the compressed block of data. With the size of the compressed data available, improvements over conventional systems may be made. Thus, method 500 may include, at 545, selectively controlling a burst-mode protocol employed to write data to memory. Then, method 500 may include, at 550, writing the compressed block of data to memory as a sub-block(s) of data aligned on default alignment boundaries using the burst-mode protocol. Method 500 may also include, at 560, storing the size of the compressed block of data so that it may be acquired upon a read access targeted at the block of compressed data.

Method 500 may also include, at 570, receiving in the memory controller a request to read a block of data. The block of data may have been compressed and stored as compressed data stored in the memory. While the request is described as being directed towards a block of compressed data, it is to be appreciated that the requester may be unaware that data is being stored in a compressed manner. Thus, the memory request may seek a block of data that happens to be stored in a compressed format although the request simply asks for a block of data. Upon receiving the request to read a block of compressed data, method 500 may include, at 580, retrieving the size of the compressed block of data stored in memory.

Once the size of the compressed data is known, method 500 may, at 585, selectively manipulate the burst-mode protocol between a memory controller and a memory in which the data is stored to facilitate efficiently retrieving the block of compressed data. Method 500 may also include, at 590, retrieving the block of compressed data from the memory using the burst-mode protocol as controlled, at least in part, by the compressed size. For example, if the size of the compressed data is less than a row, a single RAS/CAS sequence with a data bit burst length equal to the size of the data may be employed to retrieve the data. A single RAS command may be employed because the compressed data was written to the memory aligned on a default alignment boundary. Thus, a memory controller would not need to track both the size and location of the data block since, even if compressed, it would still be aligned on a default alignment boundary.

Method 500 may also include, at 595, decompressing the retrieved block of compressed data. The decompressing may occur, for example, in hardware associated with a memory controller, a RAM controller, and the like. At 599, a determination is made concerning whether another request (e.g., write, read) is to be processed. If the determination at 599 is Yes, then processing may return to either 510 or 570, otherwise processing may conclude.

In one example, methodologies are implemented as processor executable instructions and/or operations provided on a computer-readable medium. Thus, in one example, a computer-readable medium may store processor executable instructions operable to perform a method that includes receiving in a memory controller an uncompressed block of data to be stored in a memory, compressing the uncompressed block of data into a compressed block of data in hardware associated with the memory controller, and providing the compressed block of data to a RAM controller for storage in the memory. The method may also include determining the size of the compressed block of data, controlling the RAM controller to selectively manipulate a burst-mode protocol for transferring data between the RAM controller and the memory, and writing the compressed block of data to the memory as a sub-block(s) of data aligned on a default alignment boundary using a burst-mode protocol. The burst-mode protocol may be controlled, at least in part, by the size of the compressed block of data. The method may also include storing the size of the compressed block of data so that it may be acquired upon a read access targeted at the compressed data block. The method may also include receiving in the memory controller a request to read a block of compressed data stored in the memory, retrieving the size of the block of compressed data stored in the memory and retrieving the block of compressed data from the memory using the burst-mode protocol as controlled, at least in part, by the compressed size. The method may also include decompressing, in hardware, the retrieved block of compressed data.

While the above method is described being provided on a computer-readable medium, it is to be appreciated that other example methods described herein can also be provided on a computer-readable medium.

Figure 6:
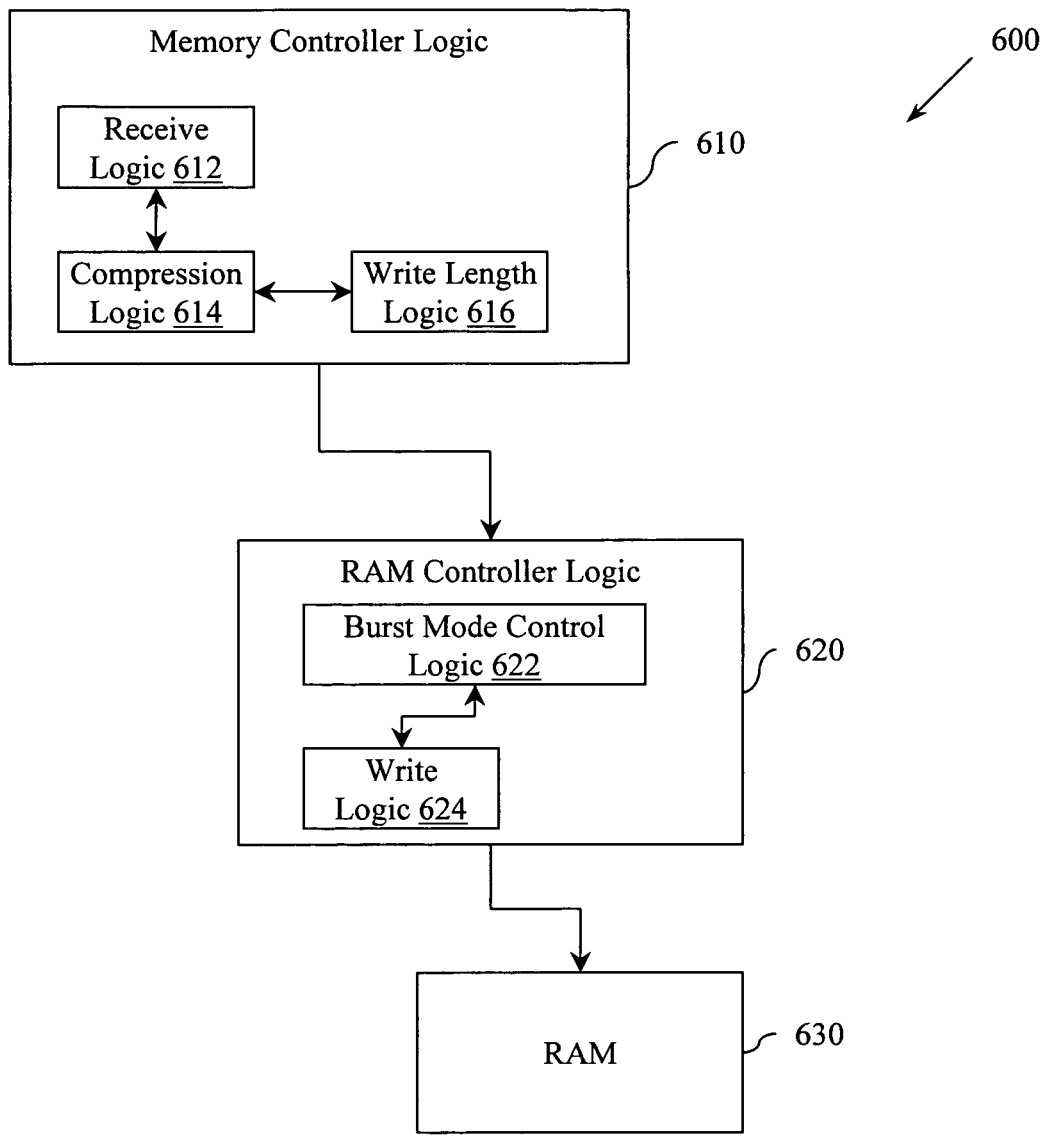
FIG. 6 illustrates an example system associated with memory controller based (de)compression.

FIG. 6 illustrates an example memory controller logic 610, RAM controller logic 620, and RAM 630 arranged into a system 600 for memory controller based compression and burst-mode protocol control. Memory controller logic 610 may include a receive logic 612 that is configured to receive a data line to be stored in memory. The sender of the data line to be stored may be unaware that data is being stored in a compressed format and thus it is to be appreciated that in some examples the data line to be stored may not be identified by the sender as a data line to be stored in compressed format but rather simply as a data line to be stored. However, the memory controller logic 610 may receive the data line as a data line to be compressed and stored. Thus, memory controller logic 610 may also include a compression logic 614 that is operably connected to the receive logic 612. The compression logic 614 may be configured to compress, in hardware, the data line. The memory controller logic 610 may also include a write length logic 616 that is operably connected to the compression logic 614 and that is configured to determine the size of the compressed data line. Determining the size of the compressed data line facilitates, for example, selectively controlling a burst-mode protocol to more efficiently read and/or write data from and/or to a memory.

The system 600 may also include a RAM controller logic 620 that is operably connected to the memory controller logic 610 and the RAM 630. The RAM controller logic 620 may include a burst-mode control logic 622 that is configured to selectively control a burst-mode protocol employed by the RAM controller 620 to communicate compressed data lines with RAM 630. For example, the burst-mode control logic 622 may facilitate selectively controlling a burst-mode sequence that writes a compressed line on a default alignment boundary in RAM 630. Writing a compressed collection of data so that it is aligned (e.g., begins) on a default alignment boundary facilitates employing a single RAS/CAS sequence and minimizing the number of bus cycles required to write the data to a memory.

RAM controller logic 620 may also include a write logic 624 that is operably connected to the burst-mode control logic 622. The write logic 624 may be configured to write the compressed data line to RAM 630, aligning the compressed data line on a default alignment boundary even though the size of the compressed data may be less than the size of the data structure typically aligned on the default alignment boundary.

Figure 7:
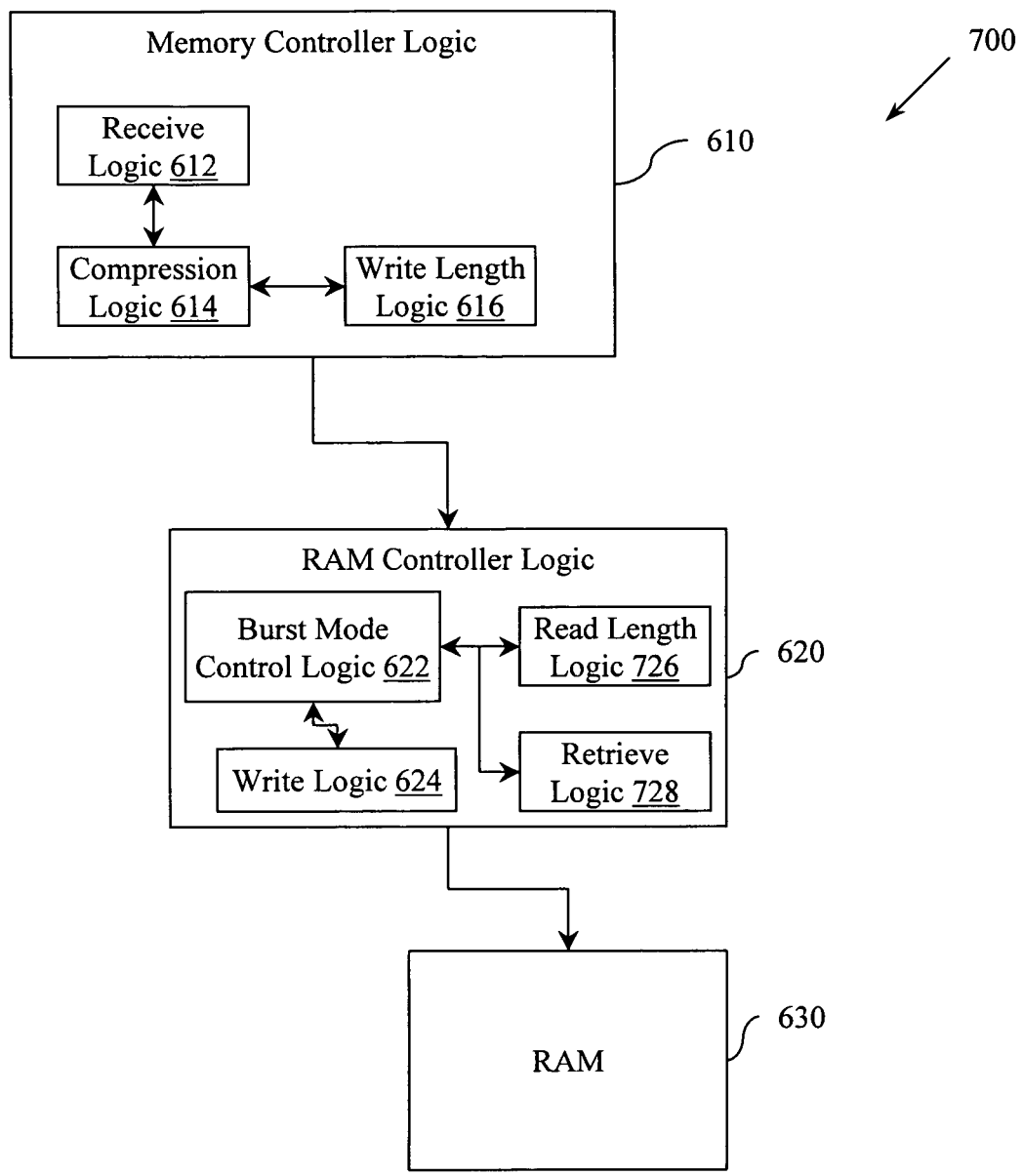
FIG. 7 illustrates another example system associated with memory controller based (de)compression.
Figure 8:
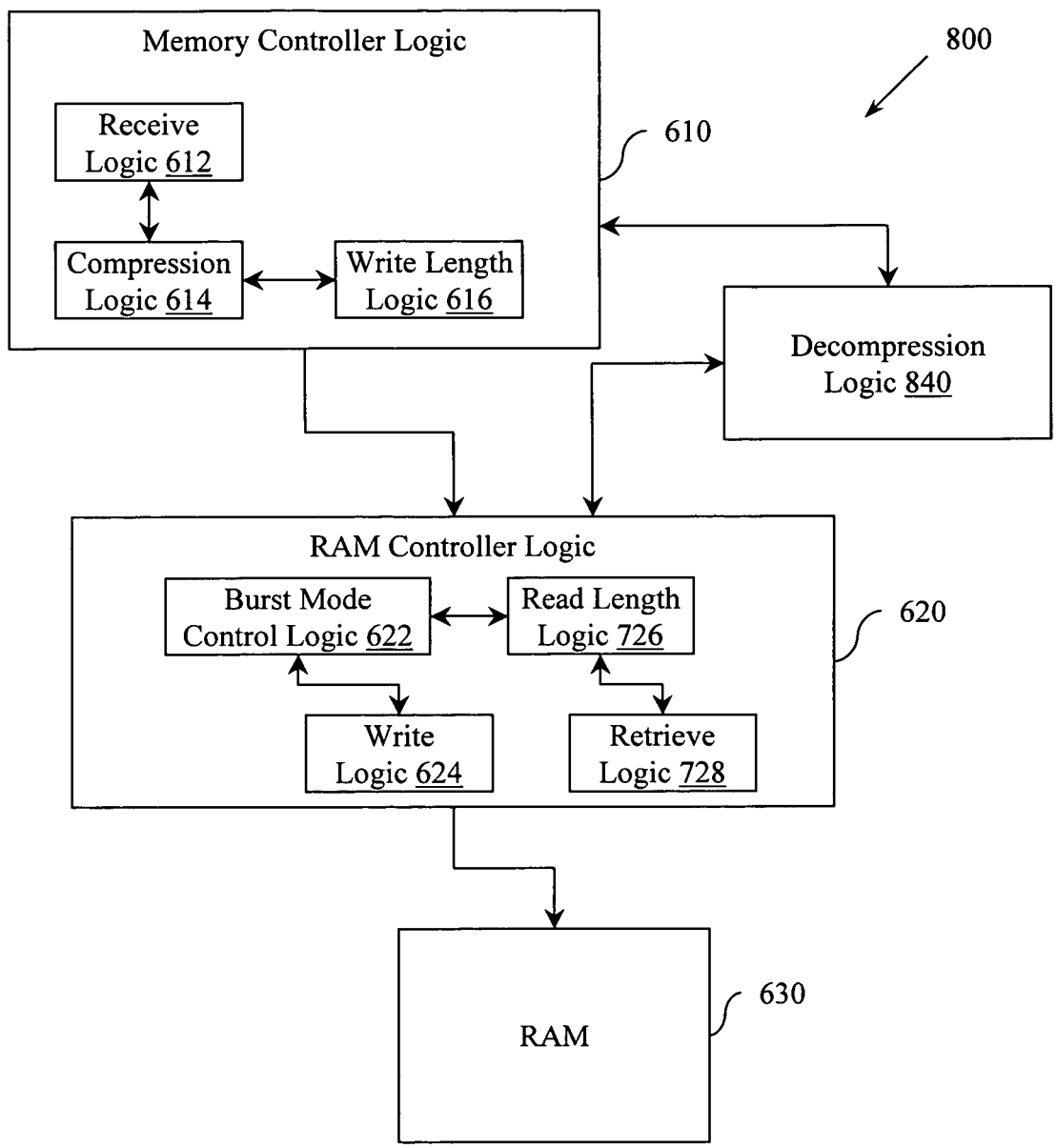
FIG. 8 illustrates another example system associated with memory controller based (de)compression.

FIG. 7 illustrates another system 700 configured with memory controller logic 610, RAM controller logic 620, and RAM 630. In FIGS. 6, 7 and 8, similar numerals (e.g., 610) refer to similar elements in the three systems 600, 700, and 800.

RAM controller logic 620 in system 700 may include a read length logic 726 that is operably connected to the burst-mode control logic 622. The read length logic 726 may be configured to determine the size of a compressed line of data stored in RAM 630. Knowing the size of a compressed line of data facilitates more precisely controlling a burst-mode protocol to more efficiently read the stored memory. RAM controller logic 620 may also include a retrieve logic 728 that is operably connected to the burst-mode logic 622 and/or the read length logic 726. The retrieve logic 728 may be configured to retrieve the compressed line of data stored in RAM 630. After the requested line of data is retrieved it may be stored, for example, in retrieve logic 728 and then provided to memory controller logic 610.

FIG. 8 illustrates another example system 800 that includes memory controller logic 610, RAM controller logic 620, and RAM 630. The system 800 also includes a decompression logic 840 that is operably connectable to memory controller logic 610 and/or RAM controller logic 620. The decompression logic 840 may be configured to decompress a line of compressed data after it is retrieved from RAM 630. While decompression logic 840 is illustrated external to memory controller logic 610 and RAM controller logic 620 it is to be appreciated that in different examples decompression logic 840 may be located in memory controller logic 610 or RAM controller logic 620. In some examples, not all compressed data will be decompressed. Therefore, in one example, decompression logic 840 may be configured to selectively decompress the compressed line of data based, at least in part, on a memory read request received by memory controller logic 610.

Figure 9:
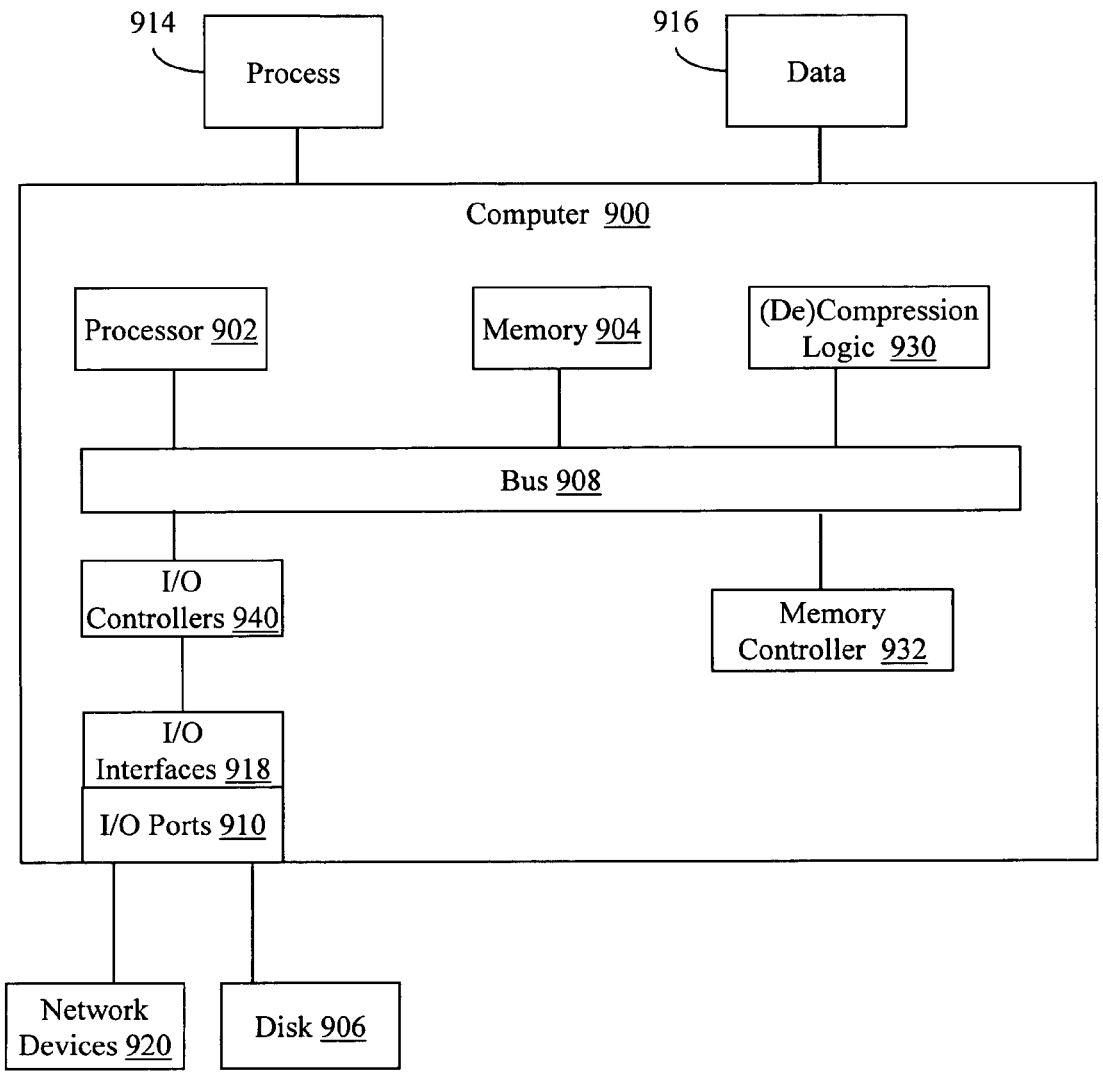
FIG. 9 illustrates an example computing environment in which example systems and methods illustrated herein can operate.

FIG. 9 illustrates a computer 900 that includes a processor 902, a memory 904, and input/output ports 910 operably connected by a bus 908. In one example, computer 900 may include a (de)compression logic 930 configured to operate with memory controller 932 to facilitate memory controller based (de)compression of data. Thus, (de)compression logic 930 may provide means for compressing, in hardware, a block of uncompressed data to be stored in a random access memory (e.g., memory 904). The (de)compression logic 930 may also provide means for decompressing, in hardware, a block of compressed data stored in the random access memory. Decompression logic 930, working together with memory controller 932 may also provide means for controlling a bus and a bus protocol employed in reading compressed data from the random access memory and writing compressed data to the random access memory. The controlling may be based, for example, on an amount of compressed data to be transferred between a memory controller and a random access memory.

The processor 902 can be a variety of various processors including dual microprocessor and other multi-processor architectures. The memory 904 may be volatile memory like RAM, synchronous RAM (SRAM), dynamic RAM (DRAM), synchronous DRAM (SDRAM), double data rate SDRAM (DDR SDRAM), direct RAM bus RAM (DRRAM), and the like.

A disk 906 may be operably connected to the computer 900 via, for example, an input/output interface (e.g., card, device) 918 and an input/output port 910. The disk 906 can include, but is not limited to, devices like a magnetic disk drive, a solid state disk drive, a floppy disk drive, a tape drive, a Zip drive, a flash memory card, and/or a memory stick. Furthermore, the disk 906 can include optical drives like a CD-ROM, a CD recordable drive (CD-R drive), a CD rewriteable drive (CD-RW drive), and/or a digital video ROM drive (DVD ROM). The memory 904 can store processes 914 and/or data 916, for example. The disk 906 and/or memory 904 can store an operating system that controls and allocates resources of the computer 900.

The bus 908 can be a single internal bus interconnect architecture and/or other bus or mesh architectures. While a single bus is illustrated, it is to be appreciated that computer 900 may communicate with various devices, logics, and peripherals using other busses that are not illustrated (e.g., PCIE, SATA, Infiniband, 1394, USB, Ethernet). The bus 908 can be of a variety of types including, but not limited to, a memory bus, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 900 may interact with input/output devices via i/o interfaces 918 and input/output ports 910. Input/output devices can include, but are not limited to, a keyboard, a microphone, a pointing and selection device, cameras, video cards, displays, disk 906, network devices 920, and the like. The input/output ports 910 can include but are not limited to, serial ports, parallel ports, and USB ports.

The computer 900 can operate in a network environment and thus may be connected to network devices 920 via the i/o interfaces 918, and/or the i/o ports 910. Through the network devices 920, the computer 900 may interact with a network. Through the network, the computer 900 may be logically connected to remote computers. The networks with which the computer 900 may interact include, but are not limited to, a local area network (LAN), a wide area network (WAN), and other networks. The network devices 920 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 920 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, and/or through a network may include combinations and mixtures of communications.

Figure 10:
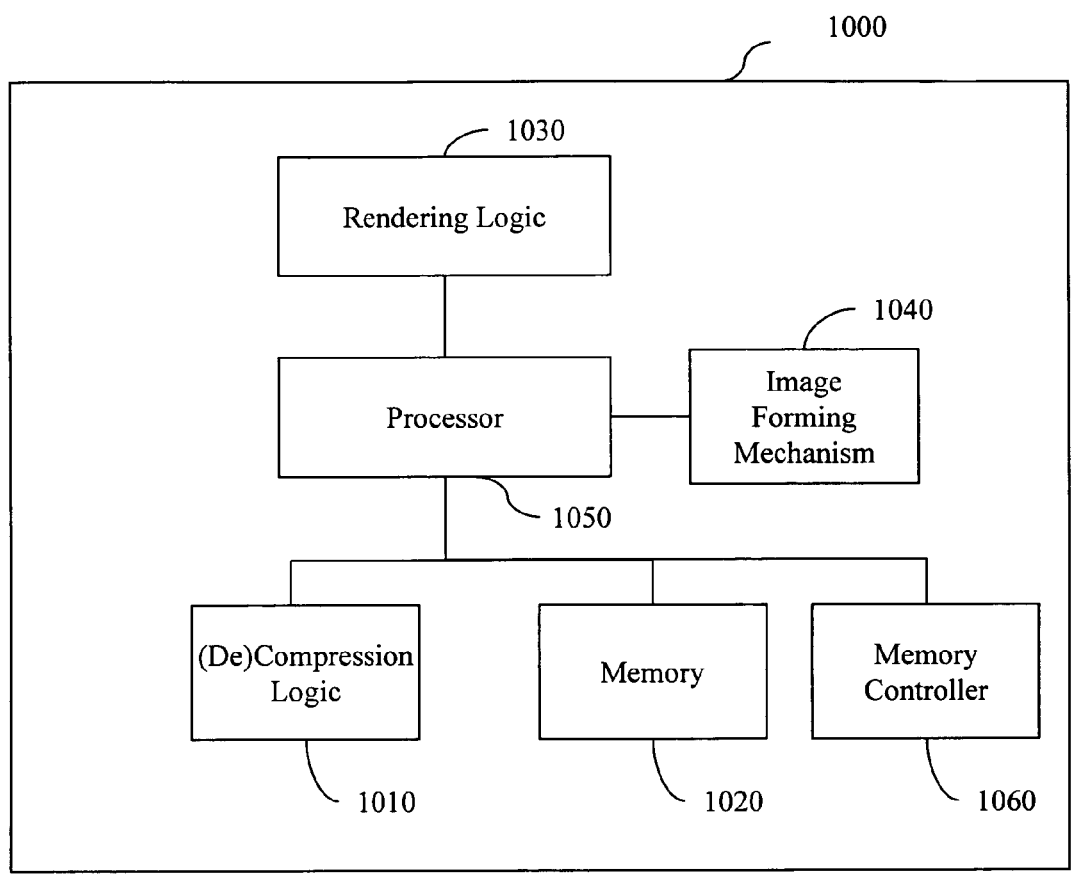
FIG. 10 illustrates an example image forming device in which example systems and methods illustrated herein can operate.

FIG. 10 illustrates an example image forming device 1000 that includes a (de)compression logic 1010 and memory controller 1060 configured to operate like the example systems described herein. The (de)compression logic 1010 and memory controller 1060 may include a logic that is configured to perform executable methods like those described herein. The (de)compression logic 1010 and memory controller 1060 may be permanently and/or removably attached to the image forming device 1000.

The image forming device 1000 may receive print data to be rendered. Thus, image forming device 1000 may also include a memory 1020 configured to store print data or to be used more generally for image processing. The image forming device 1000 may also include a rendering logic 1030 configured to generate a printer-ready image from print data. Rendering varies based on the format of the data involved and the type of imaging device. In general, the rendering logic 1030 converts high-level data into a graphical image for display or printing (e.g., the print-ready image). For example, one form is ray-tracing that takes a mathematical model of a three-dimensional object or scene and converts it into a bit-map image. Another example is the process of converting HTML into an image for display/printing. It is to be appreciated that the image forming device 1000 may receive printer-ready data that does not need to be rendered and thus the rendering logic 1030 may not appear in some image forming devices.

The image forming device 1000 may also include an image forming mechanism 1040 configured to generate an image onto print media from the print-ready image. The image forming mechanism 1040 may vary based on the type of the imaging device 1000 and may include a laser imaging mechanism, other toner-based imaging mechanisms, an ink jet mechanism, digital imaging mechanism, or other imaging reproduction engine. A processor 1050 may be included that is implemented with logic to control the operation of the image-forming device 1000. In one example, the processor 1050 includes logic that is capable of executing Java instructions. Other components of the image forming device 1000 are not described herein but may include media handling and storage mechanisms, sensors, controllers, and other components involved in the imaging process.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system, comprising:
   a memory controller configured:
      to receive an uncompressed data block to be stored in memory;
      to compress in hardware the uncompressed data block into a compressed data block;
      to compute a size of the compressed data block; and
   to selectively manipulate a burst-mode protocol employed in communicating data with a random access memory (RAM),
      where manipulating the burst-mode protocol includes computing a burst size based on the size of the compressed data block, computing a number of bursts based on the size of the compressed data block, and computing an alignment in the RAM based on the size of the uncompressed data block;
   and
   a RAM controller operably connected to the memory controller by a bus and to the RAM by a memory interface, the RAM controller being configured:
      to receive the compressed data block and the size of the compressed data block from the memory controller;
      to write the compressed data block to the RAM via the memory interface using the burst-mode protocol, where the number of bursts required to write the compressed data block to the RAM is controllable by the RAM controller and is based, at least in part, on the size of the compressed data block, and where the compressed data block is written as one or more sub-blocks of data that are aligned on a default burst mode RAM line boundary based, at least in part, on the size of the uncompressed data block; and
      to store the size of the compressed data block so that it may be acquired upon a read access targeted at the compressed data block written to the RAM.

2. The system of claim 1, the compressed data block being provided by the memory controller to the RAM controller via the bus, the number of bus cycles employed in providing the compressed data block to the RAM controller being calculated from and controlled, at least in part, by the size of the compressed data block.

3. The system of claim 1, the size of the compressed data block being provided to the RAM controller explicitly as a value.

4. The system of claim 1, the size of the compressed data block being provided to the RAM controller implicitly as an end-of-data marker.

5. The system of claim 1, the RAM controller being configured to store the size of the compressed data block in the RAM explicitly as a value.

6. The system of claim 1, the RAM controller being configured to store the size of the compressed data block in the RAM implicitly as an end-of-data marker.

7. The system of claim 1, the memory controller being configured to store the size of the compressed data block.

8. The system of claim 1, where selectively manipulating the burst-mode protocol includes determining one or more of, an RAS/CAS (row address selection/column address selection) sequence, and a configurable data bit burst length.

9. The system of claim 1, the uncompressed data block being received in the memory controller from one or more of, a processor and an input/output logic, the uncompressed data block being accompanied by a memory action request.

10. The system of claim 9, the memory controller being configured to selectively compress the uncompressed data block based, at least in part, on the memory action request.

11. The system of claim 1, the RAM controller being configured to compute a burst-mode control data based, at least in part, on a data width of the memory interface connecting the RAM controller to the RAM, and the size of the compressed data block.

12. The system of claim 1, the uncompressed data block being a cache line.

13. The system of claim 1, the memory controller being further configured to request that a stored block of compressed data be retrieved from the RAM by the RAM controller.

14. The system of claim 13, the RAM controller being configured to retrieve the stored block of compressed data from the RAM via the memory interface using the burst-mode protocol.

15. The system of claim 14, the RAM controller being configured to acquire a retrieval size of the stored block of compressed data.

16. The system of claim 15, the RAM controller being configured to customize the retrieval of the stored block of compressed data via the memory interface and to control the burst-mode protocol based, at least in part, on the retrieval size of the stored block of compressed data.

17. The system of claim 16, where one of, the RAM controller, and the memory controller are further configured to decompress the block of compressed data into a decompressed block of data after the block of compressed data is retrieved from the RAM.

18. The system of claim 17, the block of compressed data being decompressed into the decompressed block of data in hardware associated with one or more of, the RAM controller, and the memory controller.

19. The system of claim 16, the memory controller being configured to receive the block of compressed data from the RAM controller and to decompress the block of compressed data into a decompressed block of data.

20. The system of claim 16, the memory controller being configured to receive the block of compressed data from the RAM controller and to selectively decompress the block of compressed data into a decompressed block of data based, at least in part, on a memory read request received by the memory controller.

21. A system, comprising:
a memory controller configured:
   to receive, from one or more of, a processor, an input/output logic, and a cache, an uncompressed data block to be stored in memory, the uncompressed data block being accompanied by a memory action request;
   to compress, in hardware, the uncompressed data block into a compressed data block;
   to compute a size of the compressed data block; and
   to selectively manipulate a burst-mode protocol employed in communicating data with a random access memory (RAM), where manipulating the burst-mode protocol includes computing a burst size based on the size of the compressed data block, computing a number of bursts based on the size of the compressed data block, and computing an alignment in the RAM based on the size of the uncompressed data block;
and
a RAM controller operably connected to the memory controller by a bus and to the RAM by a memory interface, the RAM controller being configured:
   to receive the compressed data block and the size of the compressed data block from the memory controller, the compressed data block being provided by the memory controller to the RAM controller via the bus, where the number of bus cycles employed in providing the compressed data block to the RAM controller is calculated from and controlled, at least in part, by the size of the compressed data block;
   to write the compressed data block to the RAM via the memory interface using the burst-mode protocol as one or more sub-blocks of data aligned on one or more default burst-mode RAM line boundaries based on the size of the uncompressed data block, where the number of bursts required to write the compressed data block to the RAM is controllable by the RAM controller and is based, at least in part, on the size of the compressed data block, the number of bursts required to write the compressed data block to the RAM using the burst-mode protocol being less than the number of bursts required to write the uncompressed data block to the RAM using the burst-mode protocol; and
   to store the size of the compressed data block so that it may be acquired upon a read access targeted at the compressed data block written to the RAM.

22. A system, comprising:
a memory controller configured:
   to receive, from one or more of, a processor, an input/output logic, and a cache, an uncompressed data block to be stored in memory, the uncompressed data block being accompanied by a memory action request;
   to compress, in hardware, the uncompressed data block into a compressed data block;
   to compute a size of the compressed data block;
   to selectively manipulate a burst-mode protocol employed in communicating data with a random access memory (RAM), where manipulating the burst-mode protocol includes computing a burst size based on the size of the compressed data block, computing a number of bursts based on the size of the compressed data block, and computing an alignment address in the memory based on the size of the uncompressed data block; and
   to request that a stored block of compressed data be retrieved from a RAM;
and
a RAM controller operably connected to the memory controller by a bus and to the RAM by a memory interface, the RAM controller being configured:
   to receive the compressed data block and the size of the compressed data block from the memory controller, the compressed data block being provided by the memory controller to the RAM controller via the bus, where the number of bus cycles employed in providing the compressed data block to the RAM controller is calculated from and controlled, at least in part, by the size of the compressed data block;
   to write the compressed data block to the RAM via the memory interface as one or more sub-blocks of data aligned on one or more default burst-mode RAM line boundaries using the burst-mode protocol, the number of bursts required to write the compressed data block to the RAM being controllable by the RAM controller and being based, at least in part, on the size of the compressed data block, the number of bursts required to write the compressed data block to the RAM using the burst-mode protocol being less than the number of bursts required to write the uncompressed data block to the RAM using the burst-mode protocol;
   to store the size of the compressed data block so that it may be acquired upon a read access targeted at the compressed data block written to the RAM;
   to retrieve the stored block of compressed data from the RAM using the burst-mode protocol;
   to determine a retrieval size of the stored block of compressed data; and
   to customize the retrieval of the stored block of compressed data via the memory interface and to control the burst-mode protocol based, at least in part, on the retrieval size of the stored block of compressed data;
the system being configured to decompress the block of compressed data into a decompressed block of data in hardware associated with one or more of, the RAM controller, and the memory controller.

23. A computer configured with the system of claim 22.

24. A method, comprising:
receiving in a memory controller an uncompressed block of data to be stored in a memory;
compressing the uncompressed block of data into a compressed block of data in hardware associated with the memory controller,
providing the compressed block of data to a RAM controller for storage in the memory; and
controlling the RAM controller to selectively manipulate a burst-mode protocol for transferring data to the memory, where manipulating the burst-mode protocol includes determining a burst size based on the size of the compressed data block, determining a number of bursts based on the size of the compressed data block, and determining an alignment address in the memory based on the size of the uncompressed block of data.

25. The method of claim 24, including:
determining a size of the compressed block of data;
writing the compressed block of data to the memory as one or more sub-blocks of data aligned on one or more default burst-mode RAM boundaries using the burst-mode protocol, where the burst-mode protocol is controlled, at least in part, by the size of the compressed block of data; and
storing the determined size of the compressed block of data so that the determined size may be acquired upon a read access targeted at the compressed data block.

26. The method of claim 25, including:
receiving in the memory controller a request to read a block of compressed data stored in the memory;
retrieving a compressed size of the block of compressed data stored in the memory;
retrieving the block of compressed data from the memory using the burst-mode protocol as controlled, at least in part, by the compressed size; and
decompressing, in hardware, the retrieved block of compressed data.

27. A system, comprising:
means for compressing, in hardware, a block of uncompressed data to be stored in a random access memory;
means for decompressing, in hardware, a block of compressed data stored in the random access memory; and
means for controlling a bus and a bus protocol employed in reading compressed data from the random access memory and writing compressed data to the random access memory, where the controlling is based, at least in part, on an amount of compressed data to be transferred between a memory controller and the random access memory, the means for controlling being operably connected to the means for compressing and the means for decompressing, where controlling the bus protocol includes controlling the bus to burst data using a burst size based on the size of the compressed data block, controlling the bus protocol to burst data using a number of bursts based on the size of the compressed data block, and controlling the bus to write at an alignment address in the memory based on the size of the uncompressed block of data.

\* \* \* \* \*

UNITED STATES PATENT AND TRADEMARK OFFICE
CERTIFICATE OF CORRECTION

PATENT NO. : 8,473,673 B2
APPLICATION NO. : 11/166608
DATED : June 25, 2013
INVENTOR(S) : Blaine Douglas Gaither et al.

Page 1 of 1

It is certified that error appears in the above-identified patent and that said Letters Patent is hereby corrected as shown below:

In the Claims:

In column 19, line 7, in Claim 24, delete "controller," and insert -- controller; --, therefor.

Signed and Sealed this
Tenth Day of September, 2013

Teresa Stanek Rea
*Acting Director of the United States Patent and Trademark Office*